(12) United States Patent
Janssen et al.

(10) Patent No.: US 11,248,715 B1
(45) Date of Patent: Feb. 15, 2022

(54) PROPORTIONAL SOLENOID VALVE

(71) Applicant: MAC Valves, Inc., Wixom, MI (US)

(72) Inventors: Eric P. Janssen, Howell, MI (US); Jeffrey Simmonds, Commerce Township, MI (US); Brett Landacre, Bloomfield Hills, MI (US)

(73) Assignee: MAC Valves, Inc., Wixom, MI (US)

( * ) Notice: Subject to any disclaimer, the term of this patent is extended or adjusted under 35 U.S.C. 154(b) by 0 days.

(21) Appl. No.: 17/130,796

(22) Filed: Dec. 22, 2020

(51) Int. Cl.
*F16K 31/06* (2006.01)
*F16K 27/02* (2006.01)

(52) U.S. Cl.
CPC ........ *F16K 31/0655* (2013.01); *F16K 27/029* (2013.01)

(58) Field of Classification Search
CPC .......................... F16K 31/0655; F16K 27/029
See application file for complete search history.

(56) References Cited

U.S. PATENT DOCUMENTS

| | | | |
|---|---|---|---|
| 5,513,832 A * | 5/1996 | Becker ................ | F16K 31/0624 251/129.18 |
| 5,547,165 A * | 8/1996 | Brehm ................ | F16H 61/0251 251/129.16 |
| 10,473,229 B2 * | 11/2019 | Landacre ............ | F16K 31/0693 |

* cited by examiner

*Primary Examiner* — Eric Keasel
(74) *Attorney, Agent, or Firm* — Harness, Dickey & Pierce, P.L.C.

(57) ABSTRACT

A valve including a valve assembly and a solenoid assembly. The solenoid assembly is coupled to the valve assembly to actuate the valve assembly. The solenoid assembly includes a movable armature engaged with a poppet of the valve assembly. A plate spring having a spring force is positioned between the valve assembly and the solenoid assembly that is configured to bias the valve member of the poppet into engagement with a valve seat. Based on the spring force of the plate spring and the voltage or current that is applied to the solenoid coil, the solenoid assembly is configured to control a distance that the valve member moves relative to the valve seat to proportionally control an amount of flow that is permitted through the valve assembly.

21 Claims, 10 Drawing Sheets

PROPORTIONAL SOLENOID VALVE

FIELD

The present disclosure relates to a proportional solenoid valve.

BACKGROUND

This section provides background information related to the present disclosure which is not necessarily prior art.

Valves with proportional control provide increased control over the amount of fluid that can pass through the valve. This can be particularly important in applications where a specific amount of gas such as oxygen is being provided to a patient before, during, or after a medical procedure. In this regard, if the correct amount of the gas is not provided to the patient, the patient may experience negative effects. Other applications that may require proportional control including providing a correct amount of carbonation to a beverage, providing fluid pressure control to a mobility assist unit, and applications that require fluid dosing.

Previous proportional control valves used components to actuate the valve that were expensive such as stepper motors. In addition, previous valves were susceptible to fluctuations in pressure that affected the amount of fluid that may be permitted to pass through the valve. There is a need, therefore, for a valve that is less expensive, has increased control over the amount of fluid that can pass through the valve, and that includes a design that is not susceptible to fluctuations in pressure that can affect the amount of flow through the valve.

SUMMARY

This section provides a general summary of the disclosure, and is not a comprehensive disclosure of its full scope or all of its features.

According to a first aspect of the present disclosure, there is provided a valve that includes a block having a cavity positioned between a fluid inlet and a fluid outlet. A valve assembly is positioned within the cavity that selectively permits communication between the fluid inlet and the fluid outlet. The valve assembly includes a hollow valve retainer having a first port that communicates with the fluid inlet, a second port that communicates with the fluid outlet, and a valve seat between the first port and the second port. The hollow valve retainer houses a movable poppet including a valve member that is configured is engage and disengage with the valve seat to permit fluid to travel from the fluid inlet through the first port to the second port, and then to the fluid outlet. A solenoid assembly is coupled to the valve assembly that is configured to actuate the valve assembly to permit the communication between the fluid inlet and the fluid outlet. The solenoid assembly includes a movable armature engaged with the poppet, a first bushing that surrounds the armature, a plate spring positioned between the armature and the first bushing, and a solenoid coil that is configured to move the armature and the poppet to permit the communication between the fluid inlet and the fluid outlet. The plate spring is configured to bias the valve member of the poppet into engagement with the valve seat of the valve retainer. The plate spring has a predictable spring force. The solenoid coil is configured to move the armature and the poppet based a voltage or current that is applied to the solenoid coil, and based on the spring force of the plate spring and the voltage or current that is applied to the solenoid coil, the solenoid assembly is configured to control a distance that the valve member moves relative to the valve seat of the valve retainer to proportionally control an amount of flow that is permitted through the valve assembly.

In the valve according to the first aspect, the valve assembly may further include an adjustable valve seat that is coupled to the valve retainer, is positioned about the poppet, and includes a terminal end that is engageable with the valve member when the valve member is moved away from the valve seat of the valve retainer.

In the valve according to the first aspect, the adjustable valve seat is threadingly coupled to the valve retainer, and a position of the adjustable valve seat is variable by adjusting an amount of threading engagement between the adjustable valve seat and the valve retainer.

In the valve according to the first aspect, the solenoid assembly may include a pole piece having a position in the solenoid assembly that is adjustable, and in combination with adjusting the position of the adjustable valve seat, the valve assembly is configured to provide different flow capabilities between the fluid inlet and the fluid outlet.

In the valve according to the first aspect, the solenoid assembly may further include a second bushing that houses a pole piece that is located proximate the armature, and that is configured to be magnetized by the coil to attract the armature to open the valve assembly.

In the valve according to the first aspect, the plate spring includes an annular body having a central aperture configured for receipt of the armature, and a plurality of secondary apertures that are located radially outward from the central aperture.

In the valve according to the first aspect, the first bushing may include a stepped recess that is configured for receipt of the plate spring, wherein the stepped recess includes a first annular surface and a second annular surface located radially inward from the first annular surface, and the plate spring is mounted to the first annular surface.

In the valve according to the first aspect, the valve may further include an adapter bushing that is configured to connect the solenoid assembly to the valve assembly.

In the valve according to the first aspect, the valve assembly may further include a first diaphragm located proximate a first end of the valve retainer, and a second diaphragm located proximate an opposing second end of the valve retainer and the armature, wherein the first and second diaphragms are configured to balance fluid pressures exerted at the fluid inlet and the fluid outlet to prevent fluctuations in the fluid pressures exerted at the fluid inlet and fluid outlet from affecting performance of the valve assembly In the valve according to the first aspect, each of the first and second diaphragms may be formed of an annular plate that includes an annular bead that surrounds a central aperture of the annular pate, wherein the bead is defined by a first annular inclined surface and second annular inclined surface.

In the valve according to the first aspect, the valve assembly may further include a first end cap mated to a first end of the valve retainer and a second end cap mated to an opposite second end of the valve retainer, wherein the first diaphragm is sandwiched between the first end cap and the first end of the valve retainer, and the second diaphragm is sandwiched between the second end cap and the second end of the valve retainer.

In the valve according to the first aspect, the valve assembly may include a plurality of seal members between the poppet and the valve retainer, the plurality of seal members configured to balance fluid pressures exerted at the fluid inlet and the fluid outlet to prevent fluctuations in the fluid pressures exerted at the fluid inlet and fluid outlet from affecting performance of the valve assembly.

According to a second aspect of the present disclosure, there is provided a valve that includes a block having a cavity positioned between a fluid inlet and a fluid outlet. A valve assembly is positioned within the cavity that selectively permits communication between the fluid inlet and the fluid outlet. The valve assembly includes a hollow valve retainer having a first end and an opposing second end, a first port that communicates with the fluid inlet, a second port that communicates with the fluid outlet, and a valve seat between the first port and the second port; a movable poppet located within the valve retainer, the poppet including a valve member that is configured is engage and disengage with the valve seat to permit fluid to travel from the fluid inlet through the first port to the second port, and then to the fluid outlet; an adjustable valve seat that is coupled to the valve retainer, is positioned about the poppet, and includes a terminal end that is engageable with the valve member when the valve member is moved away from the valve seat of the valve retainer; a first diaphragm located proximate a first end of the valve retainer; a second diaphragm located proximate the opposing second end of the valve retainer; a first end cap mated to the first end of the valve retainer; and a second end cap mated to the opposing second end of the valve retainer, wherein the first diaphragm is sandwiched between the first end cap and the first end of the valve retainer, and the second diaphragm is sandwiched between the second end cap and the second end of the valve retainer. A solenoid assembly is coupled to the valve assembly that is configured to actuate the valve assembly to permit the communication between the fluid inlet and the fluid outlet. The solenoid assembly includes a movable armature engaged with the poppet, a first bushing that surrounds the armature, a plate spring positioned between the armature and the first bushing, and a solenoid coil that is configured to move the armature and the poppet to permit the communication between the fluid inlet and the fluid outlet. The plate spring is configured to bias the valve member of the poppet into engagement with the valve seat of the valve retainer, the plate spring having a spring force, the solenoid coil is configured to move the armature and the poppet based a voltage or current that is applied to the solenoid coil, and based on the spring force of the plate spring and the voltage or current that is applied to the solenoid coil, the solenoid assembly is configured to control a distance that the valve member moves relative to the valve seat of the valve retainer to proportionally control an amount of flow that is permitted through the valve assembly.

In the valve according to the second aspect, the adjustable valve seat may be threadingly coupled to the valve retainer such that a position of the adjustable valve seat is variable by adjusting an amount of threading engagement between the adjustable valve seat and the valve retainer.

In the valve according to the second aspect, the solenoid assembly may include a pole piece having a position in the solenoid assembly that is adjustable, and in combination with adjusting the position of the adjustable valve seat, the valve assembly is configured to provide different flow capabilities between the fluid inlet and the fluid outlet.

In the valve according to the second aspect, the solenoid assembly may further include a second bushing that houses a pole piece that is located proximate the armature, and that is configured to be magnetized by the coil to attract the armature to open the valve assembly.

In the valve according to the second aspect, the plate spring includes an annular body having a central aperture configured for receipt of the armature, and a plurality of secondary apertures that are located radially outward from the central aperture.

In the valve according to the second aspect, the first bushing includes a stepped recess that is configured for receipt of the plate spring, wherein the stepped recess includes a first annular surface and a second annular surface located radially inward from the first annular surface, and the plate spring is mounted to the first annular surface.

In the valve according to the second aspect, the valve may include an adapter bushing that is configured to connect the solenoid assembly to the valve assembly.

In the valve according to the second aspect, each of the first and second diaphragms are formed of an annular plate that includes an annular bead that surrounds a central aperture of the annular pate, wherein the bead is defined by a first annular inclined surface and second annular inclined surface.

In the valve according to the second aspect, the first and second diaphragms are configured to balance fluid pressures exerted at the fluid inlet and the fluid outlet to prevent fluctuations in the fluid pressures exerted at the fluid inlet and fluid outlet from affecting performance of the valve assembly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Firstly, it should be understood that the example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Further, when an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

In addition, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Moreover, spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
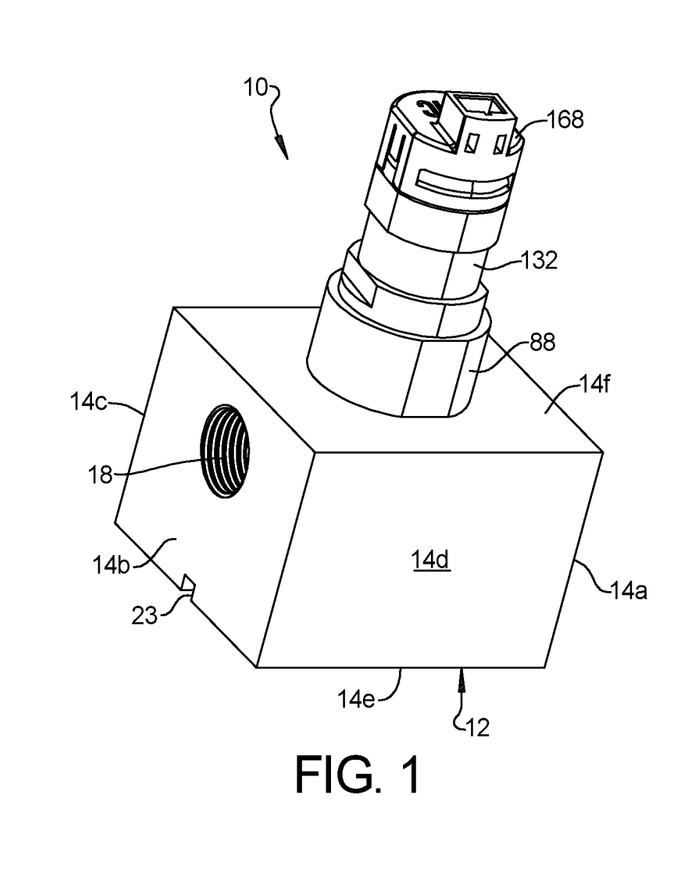
FIGS. 1 to 3 are perspective views of a valve according to a first aspect of the present disclosure.
Figure 2:
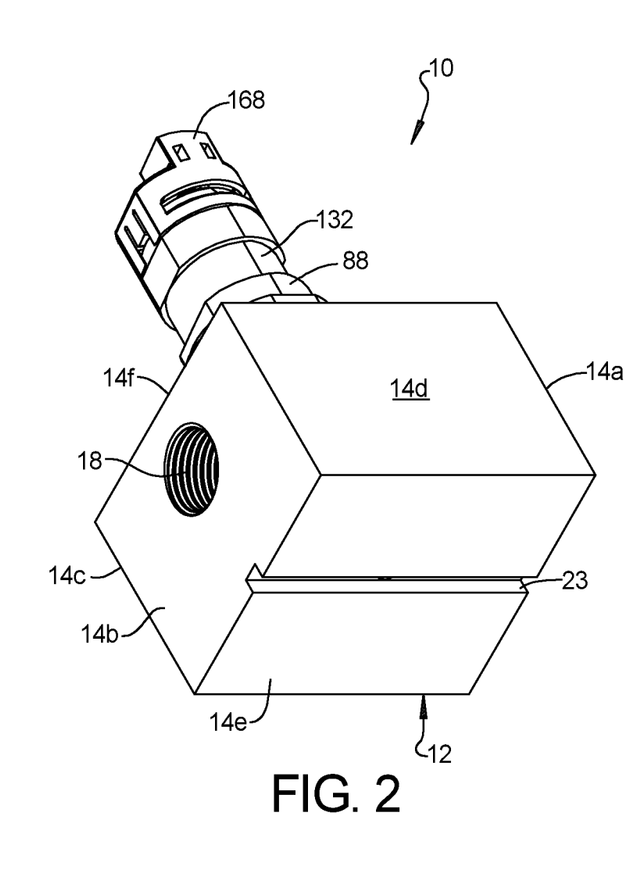
Figure 3:
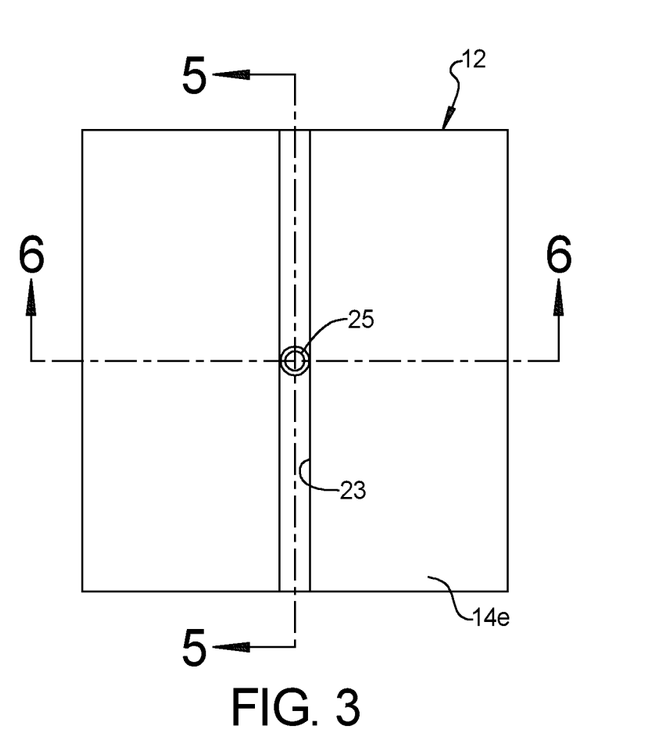
Figure 4:
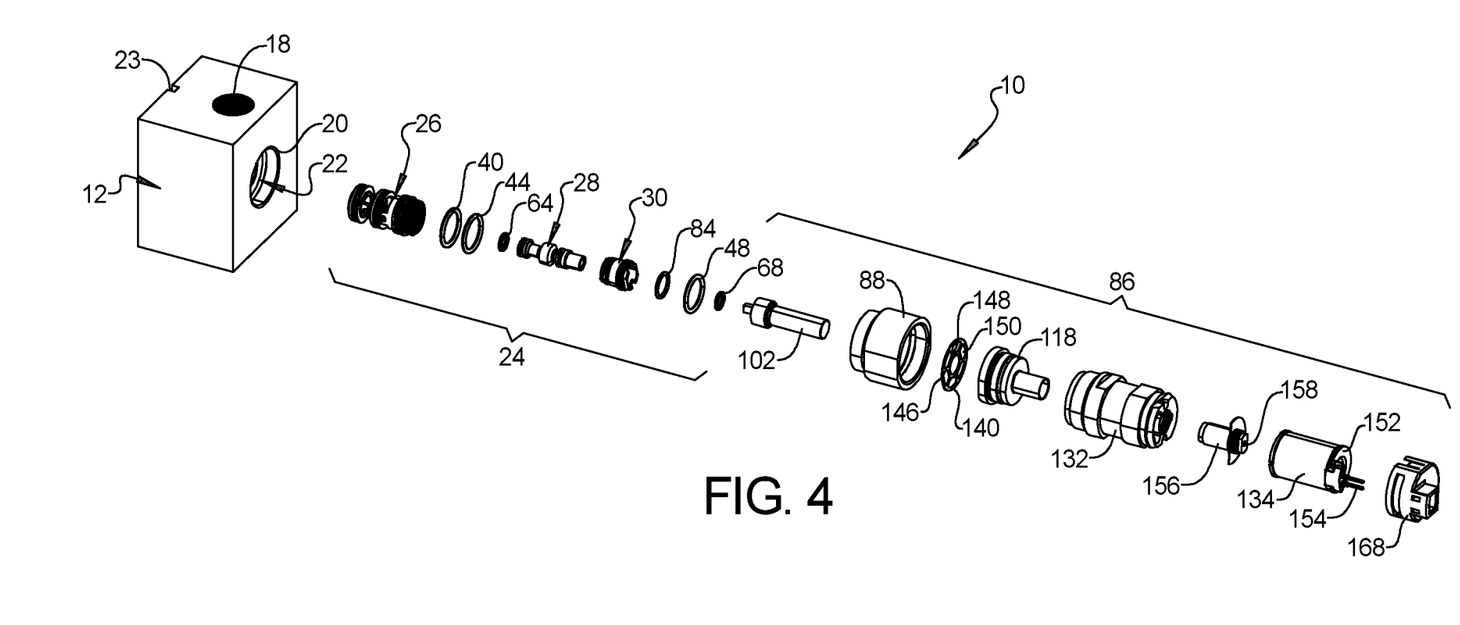
FIG. 4 is an exploded perspective view of the valve illustrated in FIGS. 1 to 3.
Figure 5:
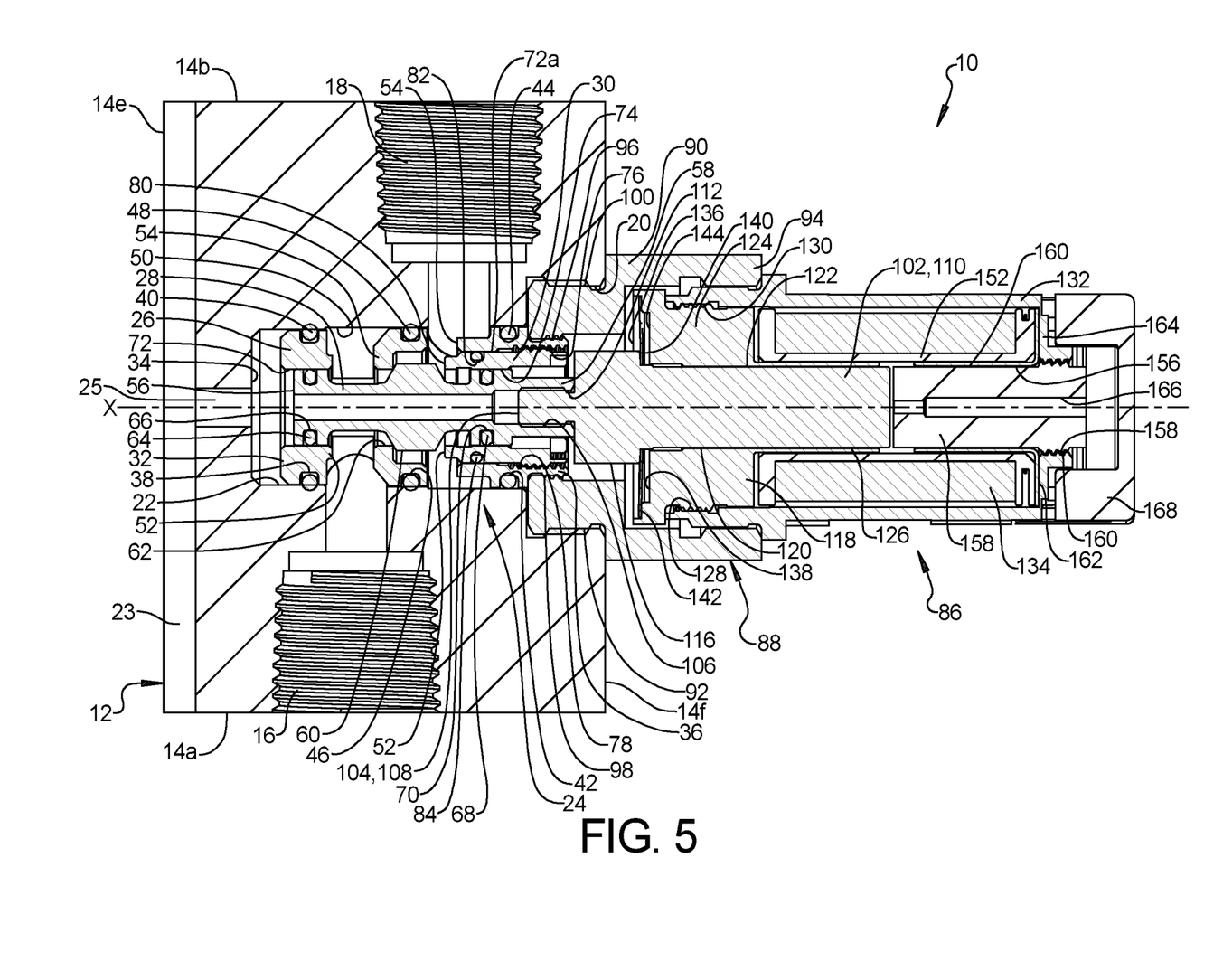
FIG. 5 is a cross-sectional view along the line 5-5 in FIG. 3.

FIGS. 1-6 illustrate a proportional solenoid valve apparatus 10 according to a first aspect of the present disclosure. Valve apparatus 10 is configured to proportionally control a flow of fluid, including liquids and gases. Valve apparatus 10 includes a housing or ported cavity block 12. Cavity block 12 is generally a cubic or rectangular cubic structure having a plurality of sides 14a, 14b, 14c, 14d, 14e, and 14f. Side 14a includes a threaded inlet port 16 and an opposite side 14b includes a threaded outlet port 18. As best shown in FIG. 5, inlet port 16 is not axially aligned with outlet port 18. Side 14f includes an opening 20 that leads to an interior cavity 22 formed within cavity block 12. Cavity 22 communicates with each of inlet port 16 and outlet port 18. Side 14e includes an elongated recess 23 having a central vent port 25. Recess 23 may be used to mount cavity block 12 to a system that uses valve apparatus 10.

While inlet port 16 is illustrated as being formed on side 14a that is opposite to the side 14b that includes outlet port 18, it should be understood that the inlet port 16 and outlet port 18 can be formed on adjacent sides of the cavity block 12, if desired. Moreover, while inlet port 16 and outlet port 18 are described as being threaded, which permits an adapter or some other type of device that provides and/or receives a flow of fluid to be attached to cavity block 12, it should be understood that other attachment methods are contemplated. It should also be understood that the inlet port 16 and the outlet port 18 may have their functions reversed (i.e., inlet port 16 may function as an outlet port, and outlet port 18 may function as an inlet port). In either configuration, the valve apparatus 10 will function in the same manner. Cavity block 12 is preferably formed of a rigid material such as a metal (e.g., brass, steel, aluminum, etc.), but may be formed of other materials (e.g., polymeric materials) dependent on the application in which valve assembly 10 is intended to be used.

As best shown in FIGS. 3-6, valve apparatus 10 includes a valve assembly 24 that is located within cavity 22. Valve assembly 24 includes a valve retainer body 26, a poppet 28, and an adjustable valve seat 30. Valve retainer body 26 is preferably formed of a rigid material such as a metal or polymeric material, and is a generally cylindrical hollow structure including a first end 32 that is closed and configured to be located proximate an end wall 34 of cavity 22, and an opposite second end 36 that is open and configured to be located proximate opening 20 of cavity 22. First end 32 includes a first radially inwardly extending recess 38 that is configured for receipt of a first valve retainer body O-ring 40. Second end 36 includes a second radially inwardly extending recess 42 that is configured for receipt of a second valve retainer body O-ring 44. A third radially inwardly extending recess 46 is located between the first and second radially inwardly extending recesses 38 and 42, which is configured for receipt of a third valve retainer body O-ring 48. Each of the valve retainer body O-rings 40, 44, and 48 are configured to provide a fluid-tight seal between valve retainer body 26 and an interior surface 50 of cavity 22.

Valve retainer body 26 includes a first pair of apertures 52 or fluid ports that are located between first radially inwardly extending recess 38 and third radially inwardly extending recess 46. A second pair of apertures 54 or fluid ports are located between second radially inwardly extending recess 42 and third radially inwardly extending recess 46. First apertures 52 are configured to be aligned with inlet port 16, while second apertures 54 are configured to be aligned with outlet port 18. While first and second apertures 52 and 54 are illustrated as being slot-shaped, it should be understood that first and second apertures 52, 54 can have any shape desired by one skilled in the art.

Poppet 28 is configured to be received within the hollow structure of valve retainer body 26, and is movable along an axis X of valve assembly 24. Poppet 28 is preferably formed of a rigid material such as a metal or polymeric material, and includes a proximate end 56 that is configured to be located proximate first end 32 of valve retainer body 26, and an opposite distal end 58 that is configured to be located proximate second end 36 of valve retainer body 26. A valve member 60 is positioned between proximate end 56 and distal end 58. Valve member 60 is configured to abut a valve seat 62 that is part of valve retainer body 26, when valve assembly 24 is in the closed position. When valve assembly 24 is actuated, as will be described in more detail later, valve member 60 will be moved away from valve seat 62, which in turn will permit fluid to flow from inlet 16 through first apertures 52, past valve member 60 toward the distal end 58 of poppet 28, and through second apertures 54 into outlet 18.

Alternatively, if outlet port 18 functions as an inlet, the flow direction could be configured so that fluid will flow from outlet port 18, through second apertures 54 past valve member 60, through first apertures 52, and out of inlet port 16.

Poppet 28 additionally includes a first seal member 64 attached to a first depression 66 formed at proximate end 56, and a second seal member 68 attached to a second depression 70 formed at distal end 58. First and second seal members 64 and 68 are similar to first, second, and third O-rings 40, 44, and 48, but are sized to correspond to poppet 28. First seal member 64 is configured to sealingly engage with an interior surface 72 of valve retainer member 26 at first end 32. Second seal member 68 is configured to sealingly engage with an interior surface 74 of adjustable valve seat 30.

Still referring to FIGS. 3-6, adjustable valve seat 30 is a cylindrical member that is configured to receive distal end 58 of poppet 28. Adjustable valve seat 30 includes an exterior threaded surface 76 that is configured to mate with an interior threaded surface 78 formed at the interior surface of valve retainer member 26 at second end 36 thereof. The adjustable valve seat 30 is described as being "adjustable" to an extent that, as best shown in FIG. 5, a terminal end 80 of the adjustable valve seat 30 can overlap with second apertures 54 formed in valve retainer body 26, which may restrict flow through the second apertures 54 when valve member 60 contacts terminal end 80. To increase or decrease the flow through second apertures 54 formed in valve retainer body 26, the amount of threaded engagement between exterior threaded surface 76 of the adjustable valve seat 30 and the interior threaded surface 78 of valve retainer body 26 can be adjusted (i.e., reduced or increased) such that the terminal end 80 does not overlap second apertures 54. Adjustable valve seat 30 includes a groove 82 formed therein that is configured for receipt of an adjustable seat O-ring 84 that sealingly engages with interior surface 72a of valve retainer body 26.

Valve apparatus 10 includes a solenoid assembly 86 that is configured to actuate valve assembly 24. Solenoid assembly 86 includes an adapter bushing 88 that is configured to connect solenoid assembly 86 to valve assembly 24. In this regard, adapter bushing 88 includes a hollow cylindrical body 90 having a first section 92 having a lesser diameter than a second section 94. As best shown in FIG. 5, first section 92 includes an interior thread 96 that is configured to mate with an outer thread 98 formed on valve retainer body 26. In addition, first section 92 includes an outer surface 100 that is configured to mate with opening 20 of cavity block 12.

An armature 102 is positioned within solenoid assembly 86. Armature 102 is a solid member formed of a material that can be magnetically attracted, and includes a mating end 104 that is configured to mate with an internally threaded end 106 of poppet 28. Mating end 104 includes a threaded projection 108 connected to a main body 110 of armature 102 by a radially narrowed neck 112. Internally threaded end 106 of poppet 28 is configured for receipt of the threaded projection 108. Radially narrowed neck 112 is connected to main body 110 of armature 102 via a radially expanded shoulder 116 that has a diameter that is greater than each of threaded projection 108, neck 112, and main body 110. Main body 110 has a diameter than is greater than threaded projection 108 and neck 112. Armature 102 is movable such that when a voltage or current is applied to solenoid assembly 86, armature 102 can move poppet 28 between the open and closed positions.

A hollow lower bushing 118 guides main body 110 of armature 102 within adapter bushing 88. Lower bushing 118 includes an inner surface 120 that extends along an outer surface 122 of main body 110 of armature 102. Lower bushing 118 includes a primary body 124 and a tubular sleeve 126. Primary body 124 includes a threaded surface 128 that is configured to mate with a threaded surface 130 of a solenoid housing 132 that houses a solenoid coil 134. An end face 136 of primary body 124 that faces radially expanded shoulder 116 includes a stepped annular recess 138 that is configured for clearance of a plate spring 140 that is positioned between shoulder 116 and annular recess 138. Recess 138 is stepped such that a first annular surface 142 of recess 138 is located closer to shoulder 116 in comparison to a second annular surface 144 of recess 138. Plate spring 140 is mounted to first annular surface 142, and because second annular surface 144 is located further away from shoulder 116, plate spring 140 is permitted to flex as armature 102 is moved towards and away from valve assembly 24.

Plate spring 140, as best shown in FIG. 4, includes an annular body 146 having a central aperture 148 configured for receipt of main body 110 of armature 102. A plurality of secondary apertures 150 are located radially outward from central aperture 148. Secondary apertures 150 may be round or oval-shaped, but any shape for secondary apertures 150 may be selected that permits plate spring 140 to flex as armature 102 is moved. Plate spring 140 may be formed of a rigid yet flexible material. Example materials include metal materials and polymeric materials. Plate spring 140 is designed to valve assembly 24 to the closed position.

Figure 6:
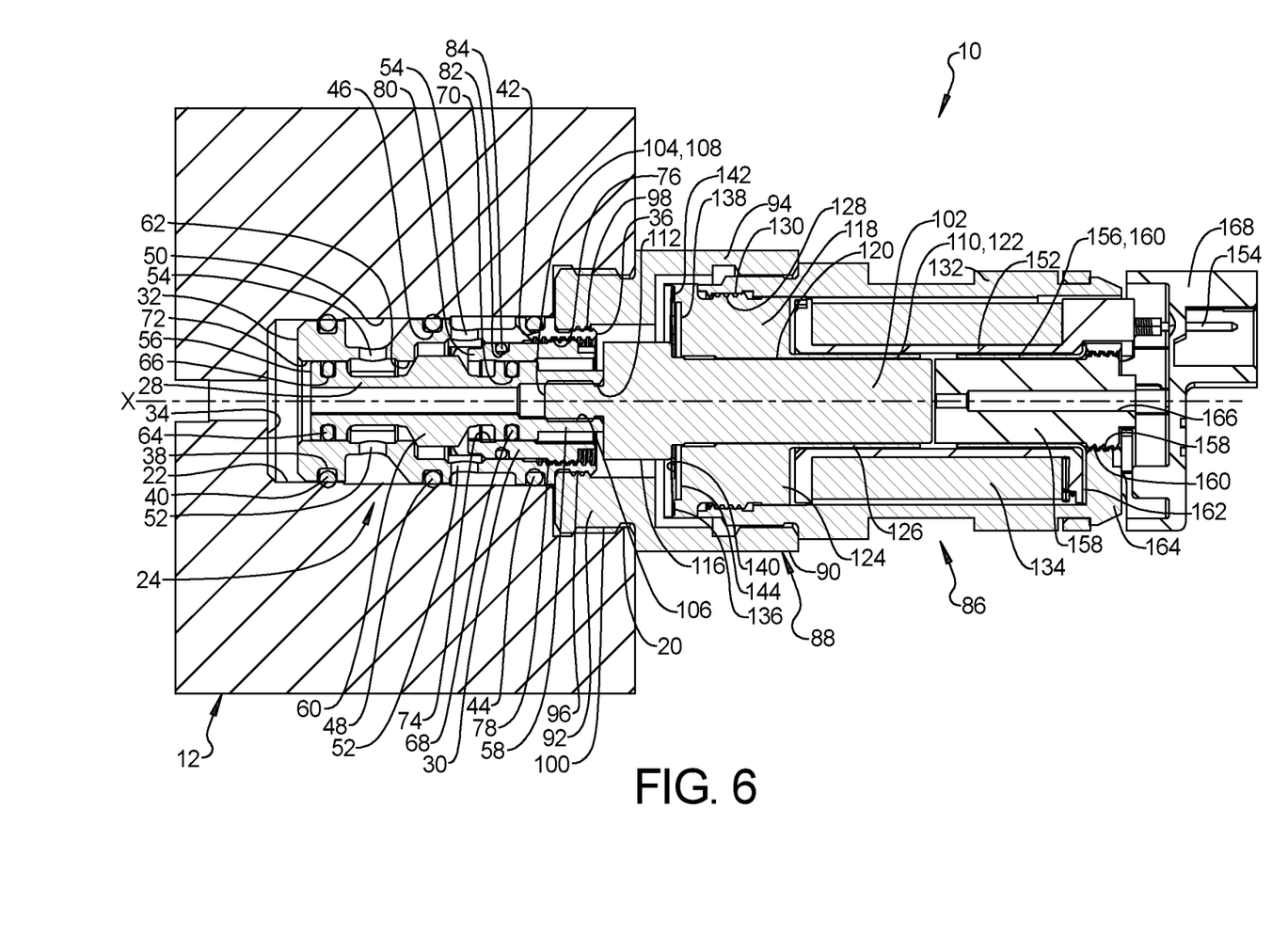
FIG. 6 is a cross-sectional view along the line 6-6 in FIG. 3.
Figure 7:
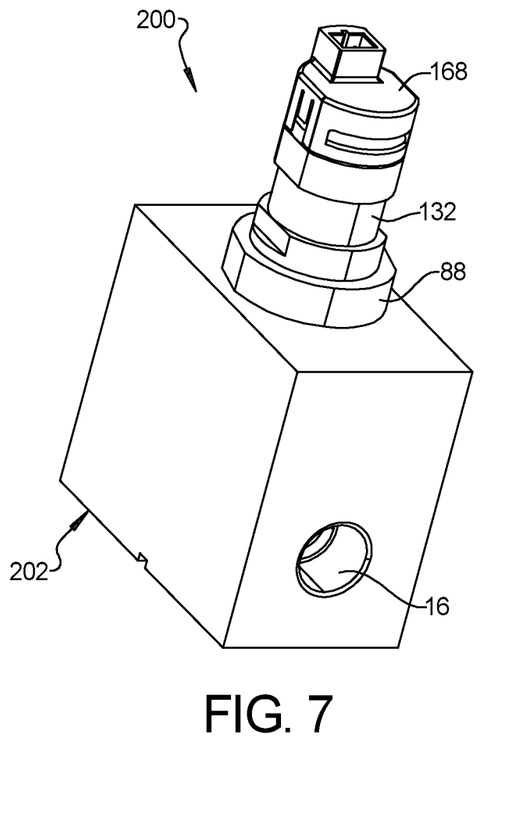
FIGS. 7 to 9 are perspective views of a valve according to a second aspect of the present disclosure.
Figure 8:
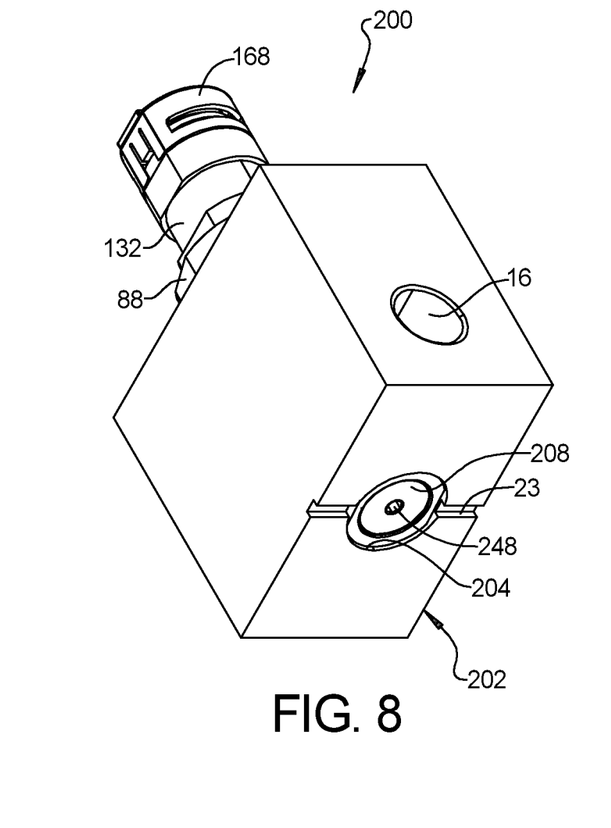
Figure 9:
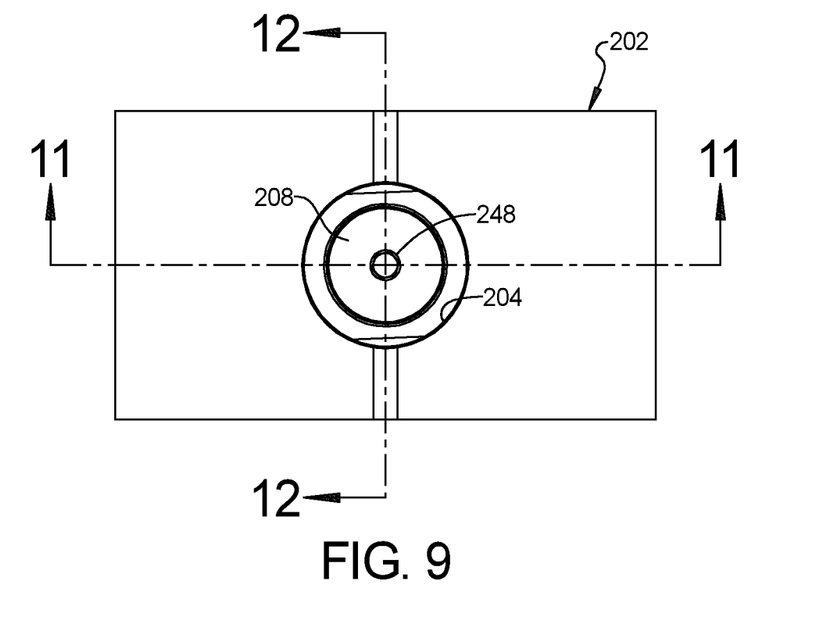

Solenoid housing 132, as noted above, houses a solenoid coil 134. Coil 134 is mounted to a hollow cylindrical support structure 152. As best shown in 4 and 6, coil 134 includes a pair of electrical leads 154 that permit a current or voltage to be applied to coil 134. An upper bushing 156 including a pole piece 158 that is formed of a magnetizable material is located within hollow support structure 152.

Upper bushing 156 is a sleeve-like structure including a cylindrical sleeve 160 that extends along pole piece 158, and a radially outwardly extending flange 162 that is configured to be located between support structure 152 and a radially inwardly extending wall 164 of housing 132. Pole piece 158 includes a threaded surface 158 that mates with a threaded surface 160 formed in wall 164 of housing 132 to fix pole piece 158 and upper bushing 158 to housing 132. While pole piece 158 is illustrated as having a central axially extending aperture 166, pole piece 158 is not required to have this feature. A cover piece 168 is attached to housing 132. Cover piece 168 is designed as a plug that permits a current or voltage application device (not shown) to be coupled to the electrical leads 154 of coil 134.

Upon application of a current or voltage to coil 134, pole piece 158 is magnetized such that pole piece 158 can magnetically attract armature 102. As armature 102 is pulled toward pole piece 158, armature 102 will pull poppet 28 toward pole piece 158 and plate spring 140 will be flexed between radially expanded shoulder 116 and lower bushing 118. As poppet 28 is pulled toward pole piece 158, valve member 60 will be disengaged from valve seat 62 of valve retainer body 26 to open valve assembly 24, which permits fluid to travel from inlet 16 through first apertures 52, past valve member 60 toward the distal end 58 of poppet 28, and through second apertures 54 into outlet 18. To close the valve assembly 24, application of the current or voltage to coil 134 is stopped at which time plate spring 140 can bias armature 102 and poppet 28 in a direction away from pole piece 158. Valve member 60 of poppet 28 then reengages with valve seat 62 to close the valve assembly 24. The same operation occurs even if the function of valve inlet 16 and valve outlet 18 is reversed.

It should be understood that the combination of the position of the adjustable valve seat 30, a magnitude of the current or voltage applied to coil 134, and the spring force exerted by plate spring 140 provides increased control over the amount of fluid that may be permitted to pass through valve assembly 24. In other words, the combination of the position of the adjustable valve seat 30, the magnitude of the current or voltage applied to coil 134, and the spring force exerted by plate spring 140 controls the distance that valve member 60 can be moved relative to valve seat 62 to increase and decrease the amount of fluid that can pass through valve assembly 24.

In this regard, as noted above, the position of the adjustable valve seat 30 can be adjusted by adjusting the amount of threaded engagement between exterior threaded surface 76 of the adjustable valve seat 30 and the interior threaded surface 78 of valve retainer body 26. In addition, the spring force of plate spring 140 can be determined prior to being placed in valve apparatus 10 to control the amount of bias at which the plate spring 140 biases valve member 60 of poppet into engagement with valve seat 62. Once the spring force of plate spring 140 is determined, valve apparatus 10 can undergo testing to determine the amount of movement of armature 102 that occurs upon application of different currents or voltages to coil 134. In this manner, the proportional amount of fluid flow through valve assembly 24 at different currents or voltages can be determined prior to being used in a system (not shown) in which valve apparatus is being used. In addition, it should be understood that the spring force of plate spring 140 can be adjusted by modifying the size and/or number of secondary apertures 150, by adjusting a thickness of plate spring 140, or through selection of a material that forms plate spring 140.

Regardless of the manner in which the spring force of the plate spring 140 is determined, it should be understood that increased proportional control over the distance that valve member 60 is moved relative to valve seat 62 can be improved through the combination of the selection of the plate spring 140 and the voltage or current that is applied to coil 134. The data associated with the current or voltage that is applied to coil 134 may be stored in a memory (not shown) of a controller (not shown) that is attached to the current or voltage application device (not shown).

It should also be understood that the valve apparatus 10 is a balanced design where any fluctuations in the fluid supply pressure will not affect the performance characteristics of the valve apparatus 10. In this regard, it should be understood that when the valve apparatus 10 is in the closed position (i.e., when valve member 60 of poppet 28 is in contact with valve seat 62 of valve retainer 26), the fluid force exerted at inlet 16 is balanced (i.e., opposed) by the force exerted by seal 64 of poppet 28 against interior surface 72 of valve retainer 26. Similarly, when the valve apparatus 10 is in the fully open position (i.e., when valve member 60 of poppet 28 is in contact with terminal end 80 of adjustable valve seat 30), the fluid force exerted at outlet 18 is balanced (i.e., opposed) by the force exerted by seal 64 of poppet 28 against interior surface 72 of valve retainer 26. When valve apparatus 10 is at an intermediate open position (i.e., when valve member 60 of poppet 28 is disengaged from valve seat 62, but not in contact with terminal end 80 of adjustable valve seat 30), the fluid forces exerted at both inlet 16 and outlet 18 are balanced (opposed) by the force exerted by seal 64 against interior surface 72 of valve retainer, the force exerted by seal 68 against interior surface 74 of adjustable valve seat 30, and the force exerted by seal 84 against surface 72a of valve retainer 26. Thus, even if the fluid forces exerted at inlet 16 and outlet 18 fluctuate, the fluid forces at inlet 16 and outlet 18 are balanced by the forces exerted by seals 64, 68, and 84, which enables valve assembly 24 to provide consistent performance (e.g., fluid output at the correct pressure and amount) throughout the operational pressure range of the valve apparatus 10.

Now referring to FIGS. 7-12, a proportional solenoid valve apparatus 200 according to a second aspect of the present disclosure will now be described. Valve apparatus 200 is similar to valve apparatus 10 described above. Accordingly, features of the valve apparatus 200 that are common to those of the valve apparatus 10 will have the same reference numbers, and description of the common features will be omitted.

Valve apparatus 200 includes a housing or ported cavity block 202. Cavity block 202 is substantially similar to cavity block 12, but includes a second opening 204 that communicates with opening 20 such that cavity 22 extends completely through cavity block 202. A valve assembly 206 is positioned within cavity 22 of cavity block 202. Valve assembly 206 includes valve retainer body 26, poppet 28, adjustable valve seat 30, and valve retainer body O-rings 40, 44, and 48. The primary difference between valve assembly 206 and valve assembly 24 is that valve assembly 206 additionally includes an end screw 208, a lower diaphragm 210, a lower end cap 212, an upper diaphragm 214, and an upper end cap 216. The use of the diaphragms 210, 214 and end caps 212, 216 provide increased sealing of valve assembly 206—especially for liquid and low leakage applications.

Figure 10:
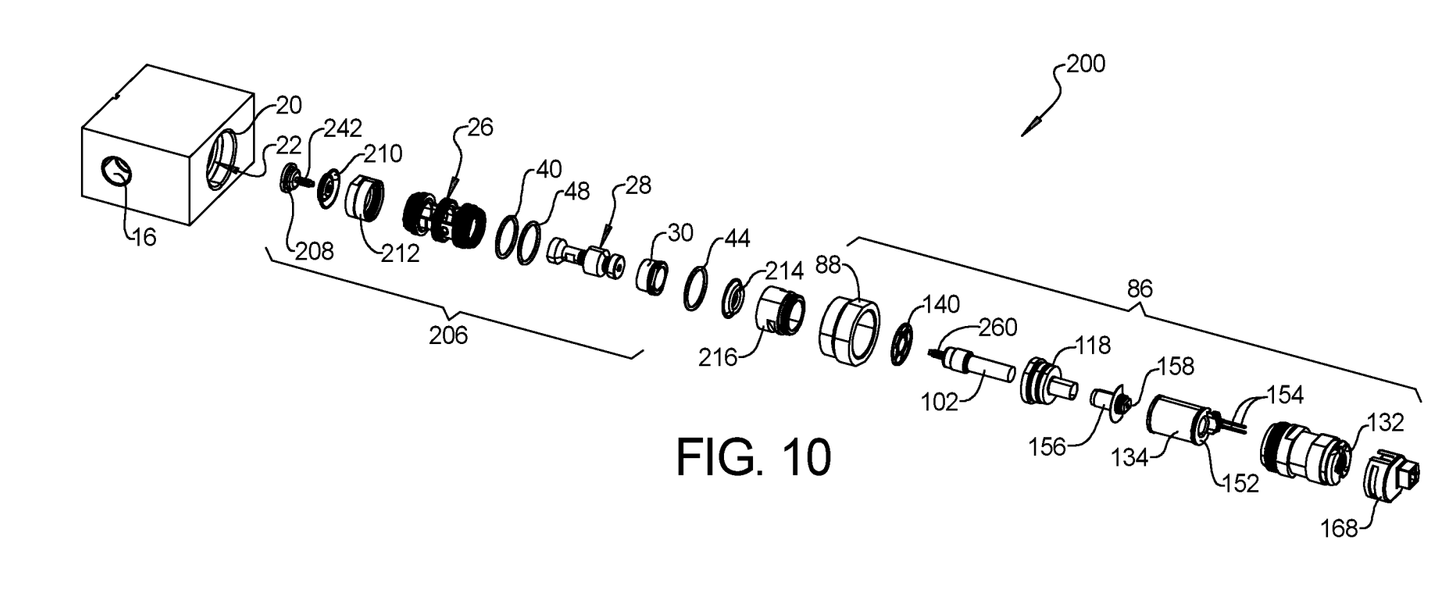
FIG. 10 is an exploded perspective view of the valve illustrated in FIGS. 7 to 9.
Figure 11:
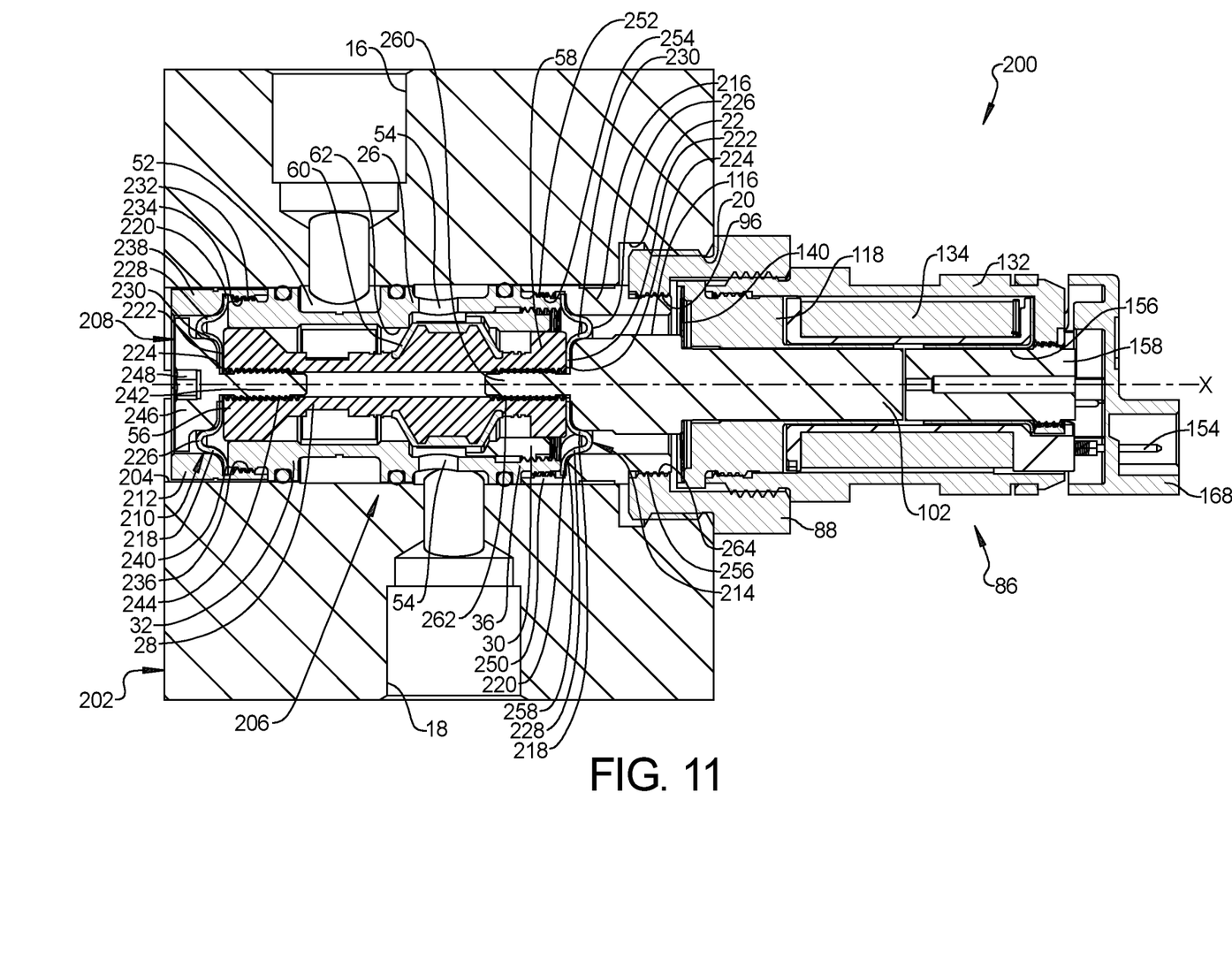
FIG. 11 is a cross-sectional view along the line 11-11 in FIG. 9.
Figure 12:
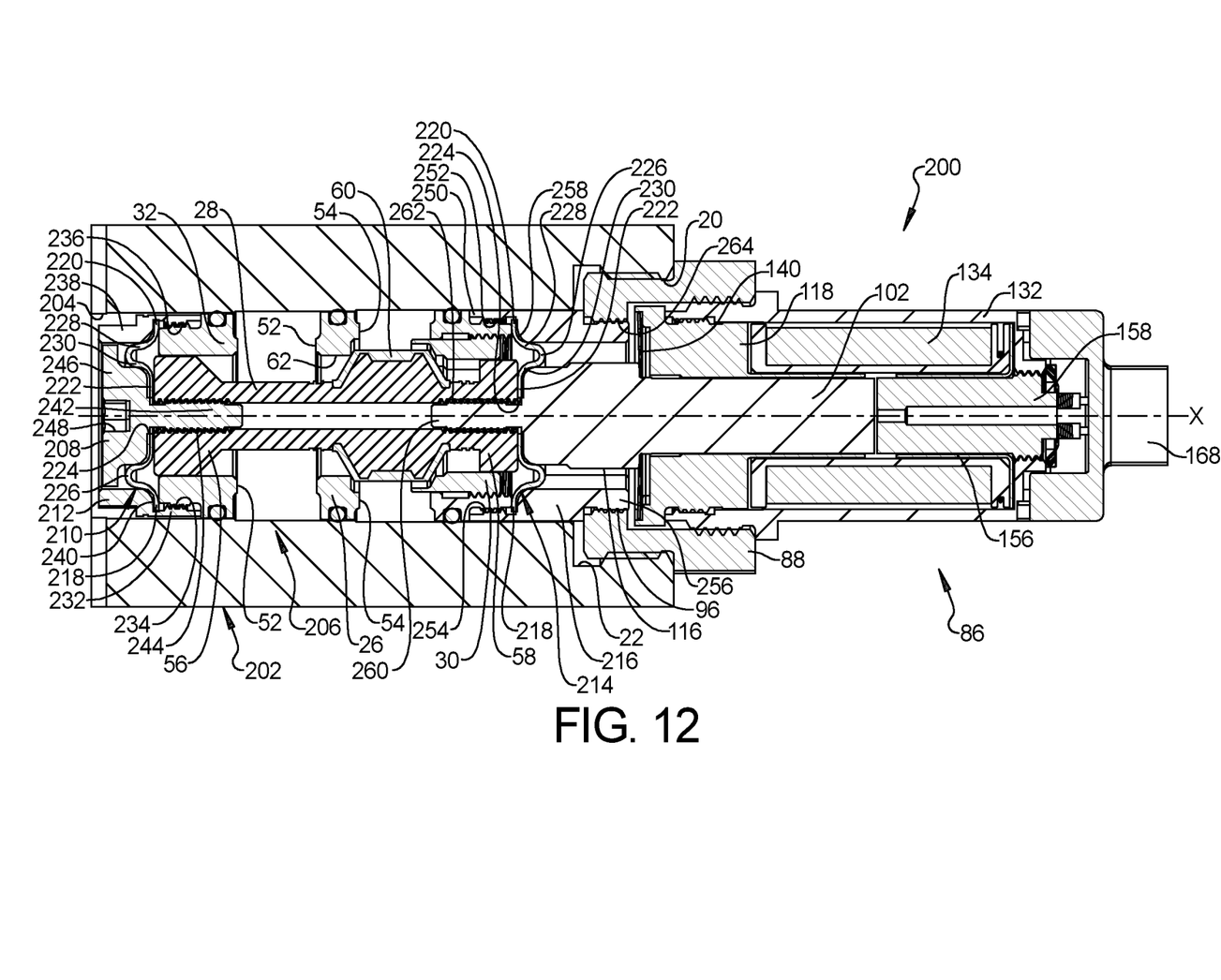
FIG. 12 is a cross-sectional view along the line 12-12 in FIG. 9.

Lower and upper diaphragms 210 and 214 are similar annular plates 218 that include an edge portion 220, a central portion 222 that defines a central aperture 224, and an annular bead 226 that extends between the central portion 222 and the edge portion 220. Edge portion 220, in a direction toward central portion 222, transitions into a first annular inclined surface 228 that terminates at bead 226. A second annular inclined surface 230 extends from bead 226 to central portion 222. The use of bead 226 and first and second inclined surfaces 228 and 230 permits diaphragms 210 and 214 to slightly flex during use of valve assembly 206 to assist in sealing valve assembly 206. In this regard, the use of diaphragms 210, 214, end caps 212, 216, end screw 208, and armature 102 remove the need for sealing members between poppet 28 and valve retainer 26 that prevent valve assembly 206 from leaking.

In addition, by removing the need for sealing members between the poppet 28 and valve retainer 26, poppet 28 is more easily controllable when actuated by solenoid assembly 86 such that additional proportional control of the valve 200 is achieved. In this regard, no additional force is required to overcome the friction between poppet 28 and valve retainer 26 as is required when there are seal members 64 and 68 between poppet 28 and valve retainer 26. Diaphragms 210 and 214 may be formed of a rigid yet flexible material such as an elastomeric material or a polymeric material.

The edge portion 220 of lower diaphragm 210 is sandwiched between lower end cap 212 and valve retainer member 26. In this regard, lower end cap 212 includes a first cylindrical section 232 having an interior threaded surface 234 that mates with a threaded surface 236 formed on valve retainer member 26. A second cylindrical section 238 having a diameter that is less than the first cylindrical section 232 is connected to first cylindrical section 232 by a radially inwardly extending abutment surface 240. The abutment surface 240 faces first end 32 of valve retainer member 26, which in contrast to the first aspect of the present disclosure is open rather than closed. The edge portion 220 is sandwiched between the abutment surface 240 and the open first end 32 of the valve retainer member 26.

Central portion 222 of lower diaphragm 210 is sandwiched between proximate end 56 of poppet 28 and end screw 208. End screw 208 includes a threaded shank 242 that extends through central aperture 224 and mates with a threaded aperture 244 formed in proximate end 56 of poppet 28. A head 246 of threaded screw 208 extends radially outward from shank 242 that extends along central portion 222 to second annular inclined surface 230. Head 246 includes a recess 248 that is configured for receipt of a tool (not shown) that can rotate end screw 208 to mate with threaded aperture 244 of poppet 28.

The edge portion 220 of upper diaphragm 214 is sandwiched between upper end cap 216 and valve retainer member 26. In this regard, upper end cap 216 includes a first cylindrical section 250 having an interior threaded surface 252 that mates with a threaded surface 254 formed on valve retainer member 26. A second cylindrical section 256 having a diameter that is less than the first cylindrical section 250 is connected to first cylindrical section 250 by a radially inwardly extending abutment surface 258. The abutment surface 258 faces second end 36 of valve retainer member 26. The edge portion 220 is sandwiched between the abutment surface 258 and the second end 36 of the valve retainer member 26. In this configuration, it is important to note that bead 226 of lower diaphragm 210 extends in a direction that is opposite to the direction in which bead 226 of upper diaphragm 214 extends.

Central portion 222 of upper diaphragm 214 is sandwiched between distal end 58 of poppet 28 and radially expanded shoulder 116 of armature 102. Armature 102 includes a threaded shank 260 that extends through central aperture 224 and mates with a threaded aperture 262 formed in proximate end 56 of poppet 28. Radially expanded shoulder 116 of armature 102 extends radially outward from shank 260 and extends along central portion 222 to second annular inclined surface 230.

Upper end cap 216 additionally includes an exterior threading 264 that mates with the interior thread 96 of adapter bushing 88. With the exception of interior thread 96 of adapter bushing 88 coupling to exterior threading 264 of upper end cap 216, adapter bushing 88 is the same as that described relative to the valve apparatus 10. In addition, valve apparatus 200 includes a solenoid assembly 86 that includes the same features as that of valve apparatus 10. That is, the solenoid assembly 86 of valve apparatus 200 includes lower bushing 118, plate spring 140, solenoid housing 132, coil 134, leads 154, upper bushing 156, pole piece 158, and cover piece 168.

Upon application of a current or voltage to coil 134, pole piece 158 is magnetized such that pole piece 158 can magnetically attract armature 102. As armature 102 is pulled toward pole piece 158, armature 102 will pull poppet 28 toward pole piece 158 and plate spring 140 will be compressed between radially expanded shoulder 116 and lower bushing 118. As poppet 28 is pulled toward pole piece 158, valve member 60 will be disengaged from valve seat 62 of valve retainer body 26 to open valve assembly 206, which permits fluid to travel from inlet 16 through first apertures 52, past valve member 60 toward the distal end 58 of poppet 28, and through second apertures 54 into outlet 18. To close the valve assembly 206, application of the current or voltage to coil 134 is stopped at which time plate spring 140 can bias armature 102 and poppet 28 in a direction away from pole piece 158. Valve member 60 of poppet 28 then reengages with valve seat 62 to close the valve assembly 206. Even if the functions of inlet 16 and outlet 18 are reversed, valve assembly 206 may operate in the same manner.

Similar to valve apparatus 10, it should be understood that the combination of the position of the adjustable valve seat 30, a magnitude of the current or voltage applied to coil 134, and the spring force exerted by plate spring 140 provides increased control over the amount of fluid that may be permitted to pass through valve assembly 206. In other words, the combination of the position of the adjustable valve seat 30, the magnitude of the current or voltage applied to coil 134, and the spring force exerted by plate spring 140 controls the distance that valve member 60 can be moved relative to valve seat 62 to increase and decrease the amount of fluid that can pass through valve assembly 206.

In addition, because valve assembly 206 additionally includes diaphragms 210, 214, end caps 212, 216, and end screw 208, the need for sealing members between poppet 28 and valve retainer 26 is removed. Moreover, by removing the need for sealing members between the poppet 28 and valve retainer 26, poppet 28 is more easily controllable when actuated by solenoid assembly 86 such that additional proportional control of the valve 200 is achieved. In this regard, no additional force is required to overcome the friction between poppet 28 and valve retainer 26 as is required when there are seal members between poppet 28 and valve retainer 26.

It should also be understood that, similar to valve apparatus 10, the valve apparatus 200 is a balanced design where any fluctuations in fluid pressure will not affect the performance characteristics of the valve apparatus 200. In this regard, while valve apparatus 200 does not include seals 64, 68, and 84, the balanced design is afforded by diaphragms 210 and 214. More specifically, when valve assembly 206 is in the open or closed position, it should be understood that fluid from inlet 16 can be located between annular bead 226 of lower diaphragm 210 and poppet 28. Due to annular bead 226 formed by inclined surfaces 228 and 230, a force is exerted by lower diaphragm 210 in a direction orthogonal to inlet 16 and outlet 18 (i.e., along axis X) that balances the fluid force exerted at inlet 16 or outlet 18 when the valve assembly 206 is in the open or closed positions, respectively. When valve assembly 206 is in an intermediate open position (i.e., when valve member 60 of poppet 28 is not engaged with either valve seat 62 of valve retainer 26 or engaged with adjustable valve seat 30), the fluid forces exerted at inlet 16 and outlet 18 are balanced (i.e., opposed) by forces exerted on the fluid by each of the annular beads 216 of both diaphragms 210 and 214. Thus, even if the fluid forces exerted at inlet 16 and outlet 18 fluctuate, the fluid forces at inlet 16 and outlet 18 are balanced by the forces exerted by diaphragms 210 and 214, which enables consistent performance throughout the operational pressure range of the valve apparatus 200.

Lastly, it should be understood each of the valve apparatuses 10 and 200 described above are capable of being modified to have different flow capabilities over a wider range of fluid pressures, without having to change the overall structure thereof. More specifically, if a flow rate in a particular application is to be changed, previous valve apparatus designs would require a structural redesign to the valve apparatus in the form of, for example, changing an orifice size, adding a spring to balance different flow pressures, or increasing and/or decreasing the size of various components of the valve apparatus. The valve apparatuses 10 and 200 of the present disclosure, however, only require minor modifications to, for example, the position of the adjustable valve seat 30 or the position of the pole piece 158 to adjust the flow capability of the valve apparatus.

In this regard, as noted above, pole piece 158 is threadingly engaged with housing 132. The position of pole piece 158, therefore, can be adjusted by adjusting the amount of threaded engagement with housing 132, which can permit the poppet 28 to move a greater or lesser distance when actuated by solenoid assembly 86. Thus, by adjusting pole piece 158 in combination with adjusting the position of adjustable valve seat 30, valve apparatuses 10 and 200 do not need to be structurally redesigned in order to accommodate different flow outputs over a wider range of pressures.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A valve comprising:
a block having a cavity positioned between a fluid inlet and a fluid outlet;
a valve assembly positioned within the cavity that selectively permits communication between the fluid inlet and the fluid outlet, the valve assembly including a hollow valve retainer having a first port that communicates with the fluid inlet, a second port that communicates with the fluid outlet, and a valve seat between the first port and the second port, the hollow valve retainer housing a movable poppet including a valve member that is configured is engage and disengage with the valve seat to permit fluid to travel from the fluid inlet through the first port to the second port, and then to the fluid outlet;
a solenoid assembly coupled to the valve assembly that is configured to actuate the valve assembly to permit the communication between the fluid inlet and the fluid outlet, the solenoid assembly including a movable armature engaged with the poppet, a first bushing that surrounds the armature, a plate spring positioned between the armature and the first bushing, and a solenoid coil that is configured to move the armature and the poppet to permit the communication between the fluid inlet and the fluid outlet,
wherein the plate spring is configured to bias the valve member of the poppet into engagement with the valve seat of the valve retainer, the plate spring having a spring force,
the solenoid coil is configured to move the armature and the poppet based a voltage or current that is applied to the solenoid coil, and
based on the spring force of the plate spring and the voltage or current that is applied to the solenoid coil, the solenoid assembly is configured to control a distance that the valve member moves relative to the valve seat of the valve retainer to proportionally control an amount of flow that is permitted through the valve assembly.

2. The valve according to claim 1, wherein the valve assembly further comprises an adjustable valve seat that is coupled to the valve retainer, is positioned about the poppet, and includes a terminal end that is engageable with the valve member when the valve member is moved away from the valve seat of the valve retainer.

3. The valve according to claim 2, wherein the adjustable valve seat is threadingly coupled to the valve retainer, a position of the adjustable valve seat being variable by adjusting an amount of threading engagement between the adjustable valve seat and the valve retainer.

4. The valve according to claim 3, wherein the solenoid assembly includes a pole piece having a position in the solenoid assembly that is adjustable, and in combination with adjusting the position of the adjustable valve seat, the valve assembly is configured to provide different flow capabilities between the fluid inlet and the fluid outlet.

5. The valve according to claim 1, wherein the solenoid assembly further comprises a second bushing that houses a pole piece that is located proximate the armature, and that is configured to be magnetized by the coil to attract the armature to open the valve assembly.

6. The valve according to claim 1, wherein the plate spring includes an annular body having a central aperture configured for receipt of the armature, and a plurality of secondary apertures that are located radially outward from the central aperture.

7. The valve according to claim 1, wherein the first bushing includes a stepped recess that is configured for receipt of the plate spring, the stepped recess including a first annular surface and a second annular surface located radially inward from the first annular surface, and the plate spring being mounted to the first annular surface.

8. The valve according to claim 1, further comprising an adapter bushing that is configured to connect the solenoid assembly to the valve assembly.

9. The valve according to claim 1, wherein the valve assembly further comprises a first diaphragm located proximate a first end of the valve retainer, and a second diaphragm located proximate an opposing second end of the valve retainer and the armature, the first and second diaphragms being configured to balance fluid pressures exerted at the fluid inlet and the fluid outlet to prevent fluctuations in the fluid pressures exerted at the fluid inlet and fluid outlet from affecting performance of the valve assembly.

10. The valve according to claim 9, wherein each of the first and second diaphragms are formed of an annular plate that includes an annular bead that surrounds a central aperture of the annular pate, the bead being defined by a first annular inclined surface and second annular inclined surface.

11. The valve according to claim 9, wherein the valve assembly further comprises a first end cap mated to a first end of the valve retainer and a second end cap mated to an opposite second end of the valve retainer, wherein the first diaphragm is sandwiched between the first end cap and the first end of the valve retainer, and the second diaphragm is sandwiched between the second end cap and the second end of the valve retainer.

12. The valve according to claim 1, further comprising a plurality of seal members between the poppet and the valve retainer, the plurality of seal members configured to balance fluid pressures exerted at the fluid inlet and the fluid outlet to prevent fluctuations in the fluid pressures exerted at the fluid inlet and fluid outlet from affecting performance of the valve assembly.

13. A valve comprising:
a block having a cavity positioned between a fluid inlet and a fluid outlet;
a valve assembly positioned within the cavity that selectively permits communication between the fluid inlet and the fluid outlet, the valve assembly including:
  a hollow valve retainer having a first end and an opposing second end, a first port that communicates with the fluid inlet, a second port that communicates with the fluid outlet, and a valve seat between the first port and the second port;
  a movable poppet located within the valve retainer, the poppet including a valve member that is configured is engage and disengage with the valve seat to permit fluid to travel from the fluid inlet through the first port to the second port, and then to the fluid outlet;
  an adjustable valve seat that is coupled to the valve retainer, is positioned about the poppet, and includes a terminal end that is engageable with the valve member when the valve member is moved away from the valve seat of the valve retainer;
  a first diaphragm located proximate a first end of the valve retainer;
  a second diaphragm located proximate the opposing second end of the valve retainer;
  a first end cap mated to the first end of the valve retainer; and
  a second end cap mated to the opposing second end of the valve retainer,
  wherein the first diaphragm is sandwiched between the first end cap and the first end of the valve retainer, and the second diaphragm is sandwiched between the second end cap and the second end of the valve retainer; and
a solenoid assembly coupled to the valve assembly that is configured to actuate the valve assembly to permit the communication between the fluid inlet and the fluid outlet, the solenoid assembly including a movable armature engaged with the poppet, a first bushing that surrounds the armature, a plate spring positioned between the armature and the first bushing, and a solenoid coil that is configured to move the armature and the poppet to permit the communication between the fluid inlet and the fluid outlet,
wherein the plate spring is configured to bias the valve member of the poppet into engagement with the valve seat of the valve retainer, the plate spring having a spring force,
the solenoid coil is configured to move the armature and the poppet based a voltage or current that is applied to the solenoid coil, and
based on the spring force of the plate spring and the voltage or current that is applied to the solenoid coil, the solenoid assembly is configured to control a distance that the valve member moves relative to the valve seat of the valve retainer to proportionally control an amount of flow that is permitted through the valve assembly.

14. The valve according to claim 13, wherein the adjustable valve seat is threadingly coupled to the valve retainer, a position of the adjustable valve seat being variable by adjusting an amount of threading engagement between the adjustable valve seat and the valve retainer.

15. The valve according to claim 14, wherein the solenoid assembly includes a pole piece having a position in the solenoid assembly that is adjustable, and in combination with adjusting the position of the adjustable valve seat, the valve assembly is configured to provide different flow capabilities between the fluid inlet and the fluid outlet.

16. The valve according to claim 13, wherein the solenoid assembly further comprises a second bushing that houses a pole piece that is located proximate the armature, and that is configured to be magnetized by the coil to attract the armature to open the valve assembly.

17. The valve according to claim 13, wherein the plate spring includes an annular body having a central aperture configured for receipt of the armature, and a plurality of secondary apertures that are located radially outward from the central aperture.

18. The valve according to claim 13, wherein the first bushing includes a stepped recess that is configured for receipt of the plate spring, the stepped recess including a first annular surface and a second annular surface located radially inward from the first annular surface, and the plate spring being mounted to the first annular surface.

19. The valve according to claim 13, further comprising an adapter bushing that is configured to connect the solenoid assembly to the valve assembly.

20. The valve according to claim 13, wherein each of the first and second diaphragms are formed of an annular plate that includes an annular bead that surrounds a central aperture of the annular pate, the bead being defined by a first annular inclined surface and second annular inclined surface.

21. The valve according to claim 13, wherein the first and second diaphragms are configured to balance fluid pressures exerted at the fluid inlet and the fluid outlet to prevent fluctuations in the fluid pressures exerted at the fluid inlet and fluid outlet from affecting performance of the valve assembly.

* * * * *